(12) United States Patent
Setchell et al.

(10) Patent No.: US 11,295,252 B2
(45) Date of Patent: Apr. 5, 2022

(54) SMART SHELF SENSOR

(71) Applicant: Spot You More, Inc., Raleigh, NC (US)

(72) Inventors: Joel R. Setchell, Advance, NC (US); James Daniel Haley, Winston-Salem, NC (US); Nathaniel Welch, Appleton, WI (US); Edward Beistle, Appleton, WI (US)

(73) Assignee: Spot You More, Inc., Raleigh, NC (US)

( * ) Notice: Subject to any disclaimer, the term of this patent is extended or adjusted under 35 U.S.C. 154(b) by 100 days.

(21) Appl. No.: 16/199,430

(22) Filed: Nov. 26, 2018

(65) Prior Publication Data

US 2019/0164098 A1    May 30, 2019

Related U.S. Application Data

(60) Provisional application No. 62/591,140, filed on Nov. 27, 2017.

(51) Int. Cl.
| | |
|---|---|
| *G06Q 10/06* | (2012.01) |
| *G06Q 10/08* | (2012.01) |
| *A47F 1/12* | (2006.01) |
| *G06Q 30/02* | (2012.01) |
| *G07F 9/02* | (2006.01) |

(52) U.S. Cl.
CPC ....... *G06Q 10/06312* (2013.01); *A47F 1/126* (2013.01); *G06Q 10/06311* (2013.01); *G06Q 10/087* (2013.01); *G06Q 30/0224* (2013.01); *G06Q 30/0238* (2013.01); *G07F 9/026* (2013.01)

(58) Field of Classification Search
CPC . A47F 1/126; A47F 2010/025; G06Q 10/087; G06Q 20/203
USPC ........................................................ 700/236
See application file for complete search history.

(56) References Cited

U.S. PATENT DOCUMENTS

| | | | |
|---|---|---|---|
| 5,097,328 A | 3/1992 | Boyette | |
| 9,576,417 B2 * | 2/2017 | Christianson | ........... G07F 11/38 |

(Continued)

FOREIGN PATENT DOCUMENTS

| | | |
|---|---|---|
| JP | 2005-322153 A | 11/2005 |
| JP | 2008-59508 A | 3/2008 |

(Continued)

OTHER PUBLICATIONS

International Search Report for International Application No. PCT/US2018/062415, dated Jan. 31, 2019, 4 pgs.

(Continued)

*Primary Examiner* — Timothy R Waggoner
(74) *Attorney, Agent, or Firm* — Burr & Forman, LLP

(57) ABSTRACT

A system for tracking a count of a product in a distribution unit is provided. The distribution unit may have a front portion where the product is presented for dispensing. The system may include a track, a product positioner, a sensor, and a processor. The track may be configured for holding the product in the distribution unit. The product positioner may interact with the track for pushing the product to the front of the distribution unit. The sensor may determine a position of the product positioner. The processor may calculate a product count in response to the position.

21 Claims, 9 Drawing Sheets

(56) References Cited

U.S. PATENT DOCUMENTS

| | | |
|---|---|---|
| 2003/0069797 A1 | 4/2003 | Harrison |
| 2005/0149414 A1* | 7/2005 | Schrodt ............... G06Q 10/087 705/29 |
| 2005/0279722 A1* | 12/2005 | Ali ......................... A47F 10/00 211/59.3 |
| 2006/0059049 A1 | 3/2006 | Morris |
| 2008/0052169 A1* | 2/2008 | O'Shea ................. G06Q 30/02 705/14.17 |
| 2009/0119142 A1 | 5/2009 | Yenni et al. |
| 2009/0271243 A1 | 10/2009 | Sholl et al. |
| 2012/0209686 A1* | 8/2012 | Horowitz ............. G06K 7/1417 705/14.26 |
| 2012/0303404 A1 | 11/2012 | Nudd |
| 2013/0018686 A1 | 1/2013 | Wright |
| 2013/0278837 A1 | 10/2013 | Du |
| 2014/0222521 A1 | 8/2014 | Chait |
| 2014/0330605 A1 | 11/2014 | Connolly et al. |
| 2015/0123787 A1 | 5/2015 | Watson |
| 2015/0317682 A1* | 11/2015 | Kayser ................... G01G 19/42 705/14.55 |
| 2016/0061747 A1 | 3/2016 | Lee |
| 2016/0134930 A1* | 5/2016 | Swafford ............... A47F 5/0068 725/80 |
| 2016/0368753 A1 | 12/2016 | Bethuy |
| 2016/0371631 A1* | 12/2016 | Jetcheva ............. G06Q 10/087 |
| 2017/0061212 A1 | 3/2017 | Tanaka |
| 2017/0108838 A1 | 4/2017 | Todeschini |
| 2017/0303704 A1 | 10/2017 | Taylor et al. |
| 2017/0351276 A1* | 12/2017 | Setchell .............. F27D 21/0014 |
| 2018/0341891 A1 | 11/2018 | Setchell |

FOREIGN PATENT DOCUMENTS

| | | |
|---|---|---|
| KR | 10-2010-0081890 A | 7/2010 |
| KR | 10-2011-0003538 A | 1/2011 |
| KR | 10-2015-0081386 A | 7/2015 |
| WO | WO-0161552 A2 | 8/2001 |
| WO | WO 2006/023954 A2 | 3/2006 |
| WO | WO 2007/149967 A2 | 12/2007 |
| WO | WO 2016/077597 A1 | 5/2016 |

OTHER PUBLICATIONS

International Search Report, International Application No. PCT/US2018/034159, dated Nov. 12, 2018, 3 pgs.

Office Action from corresponding Japanese application No. 2020-515826, dated Dec. 22, 2020, with English machine translation, 6 pgs.

Office Action from corresponding Korean application No. 2019-7034757, dated Dec. 17, 2020, 14 pgs.

* cited by examiner

SMART SHELF SENSOR

RELATED APPLICATIONS

This application claims the benefit of U.S. Provisional Patent Application No. 62/591,140, entitled "Smart Shelf Sensor," filed Nov. 27, 2017, the content of which is hereby incorporated by reference in its entirety.

BACKGROUND

1. Field of the Invention

The present invention generally relates to a system for tracking product count in a distribution unit.

2. Description of Related Art

Convenience stores, especially stores attached to gas stations, are trying to increase revenue and store traffic. Often convenience stores, especially those attached to a gas station, are often used for eating and restroom breaks by travelers. These convenience stores also include a great variety of products and services which may present challenges in properly training employees and monitoring products over the large number of operational tasks.

SUMMARY

The present disclosure describes a system for tracking a count of a product in a distribution unit is provided. The distribution unit may have a front portion where the product is presented for dispensing. The system may include a track, a product positioner, a sensor, and a processor. The track may be configured for holding the product in the distribution unit. The product positioner may interact with the track for pushing the product to the front of the distribution unit. The sensor may determine a position of the product positioner. The processor may determine a product count in response to the position.

Further objects, features and advantages of this disclosure will become readily apparent to persons skilled in the art after a review of the following description, with reference to the drawings and claims that are appended to and form a part of this specification.

DETAILED DESCRIPTION

Figure 1:
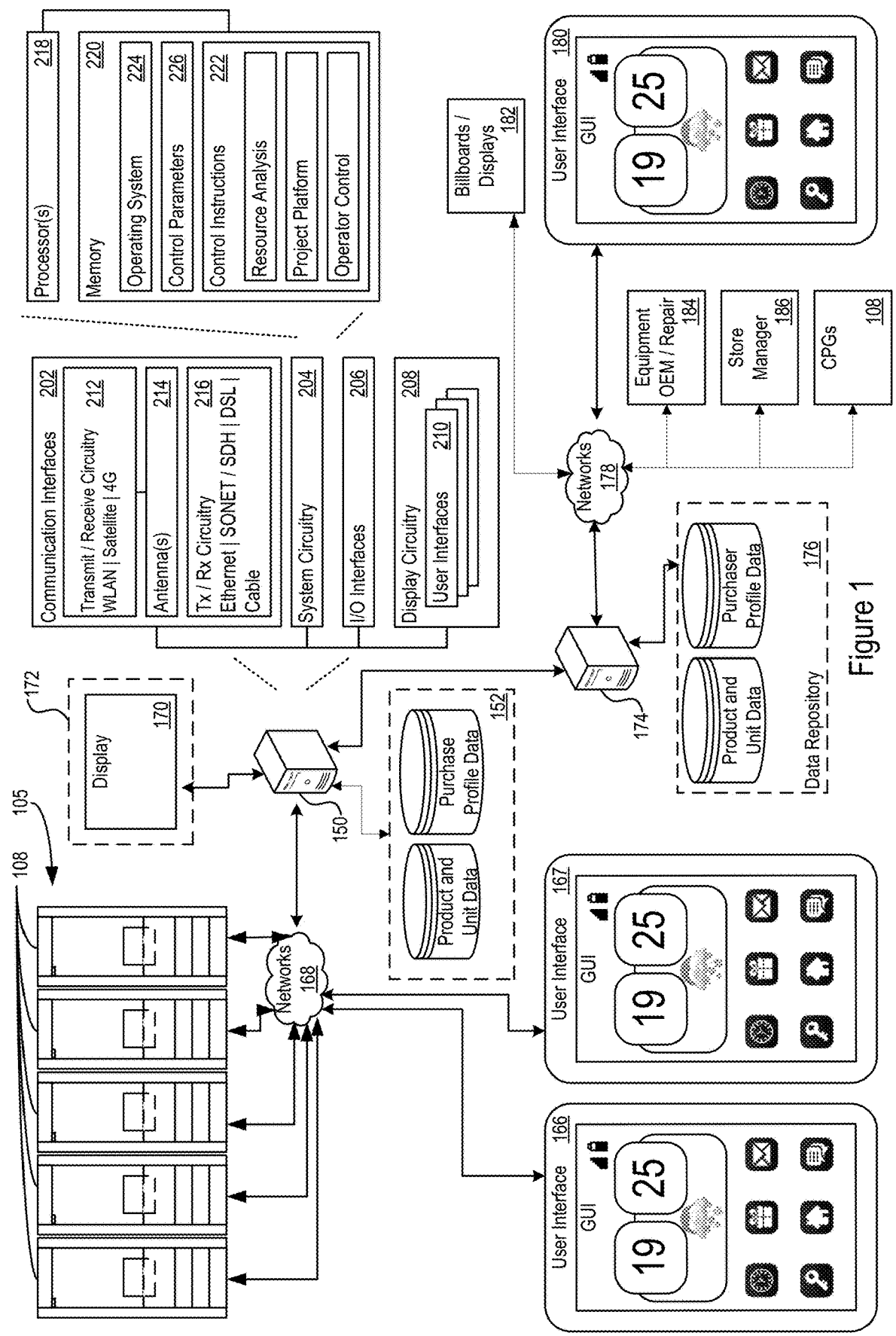
FIG. 1 is a schematic view of a system for tracking product count.

Personnel in a store may have to monitor and complete a wide variety of tasks in a very busy environment. With expanding offerings in convenience stores, tracking and verifying product counts is becoming more important. Sensor and point of sale information can provide important indicators of when and how well tasks, such as product replenishment are being accomplished.

Sensors may be used in conjunction with retail locations such as convenience stores and gas stations. The sensors may be in and around the store. For example some sensors may be located at fixed locations within the stores or may be attached to or integrated within certain devices within the store. Sensors may be located in equipment such as product dispensing units. Sensors attached to or integrated within the devices may provide information regarding the use of the device and/or location of the device. Further, information may be provided that relate the product count characteristics of a product to one another or time intervals to interpret the product flow within the store. The analysis may compare product count information of the dispensing units to other products or expected product count characteristics. Analysis of the product count information may be based on defined logic and thresholds defined within the device, a local server, or a cloud based analytics platform. The local server or analytics platform may house the data pushed up from the sensor devices and notification alerts may be triggered based on certain events. Certain data may be distributed by the server to relevant stakeholders based on a defined frequency or immediately based on certain conditions being met.

The system may generate, collect and monitor data related to tasks such as product replenishment assigned to personnel. The data may include notification of a task, accepted task employee ID, accepted task time, presentation of task location (e.g. on a map), presentation of task description/check list, assistance notification, notification from personnel that the task has been completed, confirmation from sensor system that the task has been completed, feedback from store manager regarding quality of performed tasks, incentives provided to consumers to provide quality feedback related to tasks, ratings for particular personnel (e.g. based on time to start tasks, time to complete tasks), quality feedback of tasks (consumers/store manager, product manufacturers, OEM equipment manufacturers), notification to inform store manager if time to complete task has exceeded a threshold time, notification to inform store manager if quality feedback of task is below threshold, rating for particular personnel based on time to start tasks, time to complete tasks, quality feedback of tasks (consumers/store manager), seek feedback from consumers regarding quality of tasks, provide incentive to consumers to provide quality feedback, provide rating for stores as a combination of the personnel assigned or currently working at a store.

Data may be collected by the smart sensors and pushed to the cloud to be analyzed. Such data may include, but may not be limited to: the capacitance in the spring coil, a position of the product positioner, or a product count in a track, product depletion rate, times of product depletion, etc.

The relevant stakeholder groups that will receive notification alerts and/or data include, but may not be limited to store clerks, store managers, CPGs, consumers, and equipment OEMs. As a general rule, each notification trigger and data distribution set discussed in this disclosure can be mapped (one to one [1-1] and/or one to many [1-n]) to each of the delivery channels/mechanisms discussed.

FIG. 1 is a block diagram of a system for monitoring the product count of one or more products. The system may include a number of sensors monitoring products and equipment at a retail location such as a convenience store. Although the system may interact with multiple sensors at multiple convenience store locations simultaneously. The sensors may be smart sensors and therefore may receive and/or send data to a monitoring production server either directly or through a hub.

A smart sensor may include a processor. A processor may allow the sensor to sample and transmit data upon receipt of a command to do so and/or continuously sample data to provide a continuous stream of data with regard to the characteristic being monitored, and evaluate if the data exceeds certain defined thresholds and send an alert in response to the monitored characteristic exceeding one or more thresholds. The alert may include and alert classification as well as the monitored data. The processor may also provide for the measurement unit to be calibrated and/or reset at the location of the sensor or remotely from a server. The sensor may include a display and/or end-user interface (e.g. buttons or switches, etc.) for setting and reviewing real time data as well as setting and monitoring alert information or threshold information. The sensors may monitor characteristics related to product count, such as product count, capacitance in the spring, or position of the product positioner. Alerts and/or tasks may be generated in response to any of the product or unit characteristics noted herein, either based on a threshold or a comparison with other product or unit characteristics. Alerts and or tasks may also be generated in response to any of product count related characteristics noted herein, either based on a threshold or a comparison with other product count characteristics.

The system may automatically determine and report to an information system the inventory (product count) contained in a spring-loaded product dispenser. For example, a tobacco retailer and manufacturer can benefit from knowing the exact count of cigarette packs in each spring-loaded dispenser without requiring a person to manually count them. Uses for such an automatic system include automatic inventory assessment, automatic inventory replenishment, determination of sales velocity and other metrics (e.g. sales of a particular brand over an arbitrary period of time) and loss prevention.

To facilitate the tracking of product counts, products may be loaded into product units 108 that store and present the products on shelves of a dispensing unit 105. A dispensing unit 105 may include one or a plurality of product units that may sense the information indicative of product counts. Each of the product units 108 may be connected (e.g., via WIFI) to a server 150 over a network 118 to exchange product information. The product units 108 may provide product counts, or sensor data that may be used to determine product count to the server 150. The server 150 may provide product information such as product dimensions, or price data to the product units 108. The product units 108 may include displays (e.g. LCD or LED displays) to display the price for the product in the product units 108. The system may change the price on the display based on sales statistics, inventory numbers, or other variables discussed herein that are measured by the system.

The product units 108 may sense the product count based on various sensor technologies. One implementation may make use of the capacitance formed in the spring based on the position of the coil as it pushes against the product positioner. Other technologies may make use of lasers to measure a distance from one point in the product unit to the product positioner. These techniques could use triangulation or in one implementation described in more detail below a time of flight (TOF) of the laser beam may be used to determine the distance and thereby determine the product counts.

Figure 2:
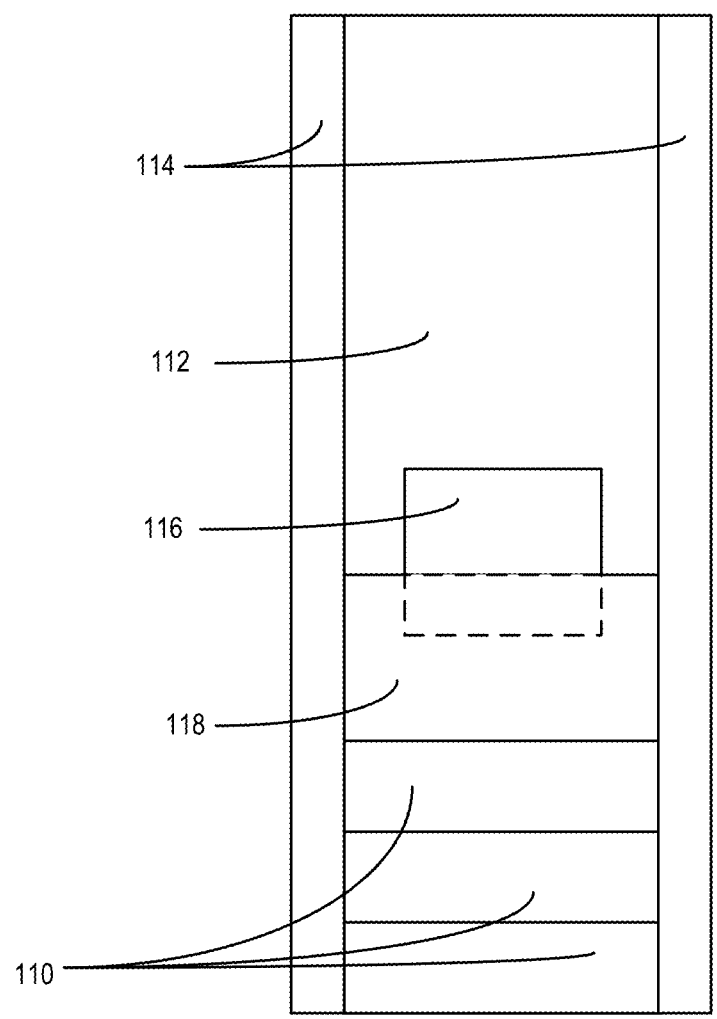
FIG. 2 is a top view of a product unit for tracking product count in a distribution unit.
Figure 3:
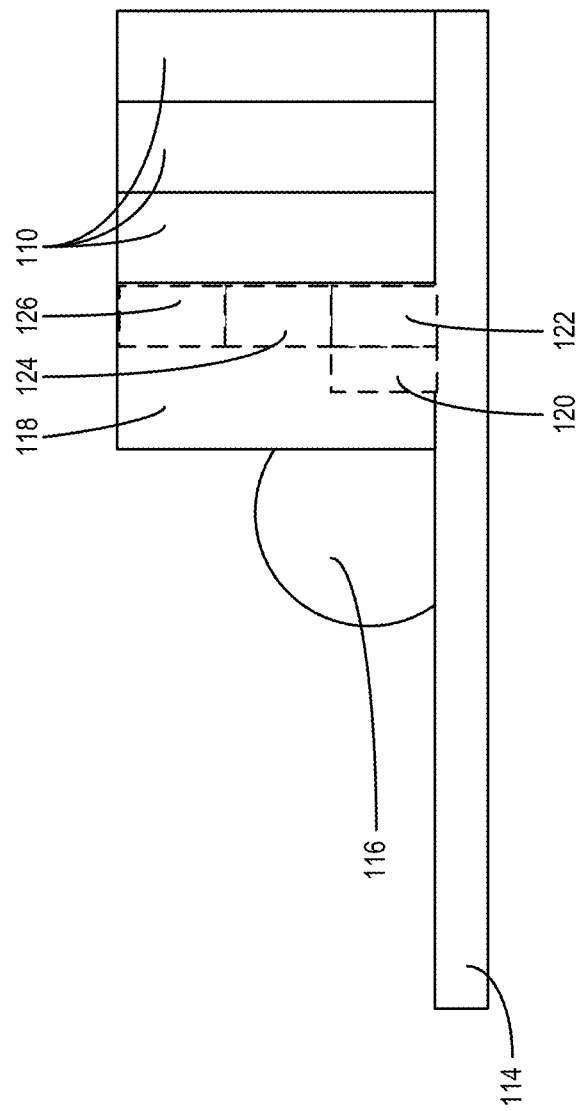
FIG. 3 is a side view of the product unit for tracking product count in a distribution unit.
Figure 4:
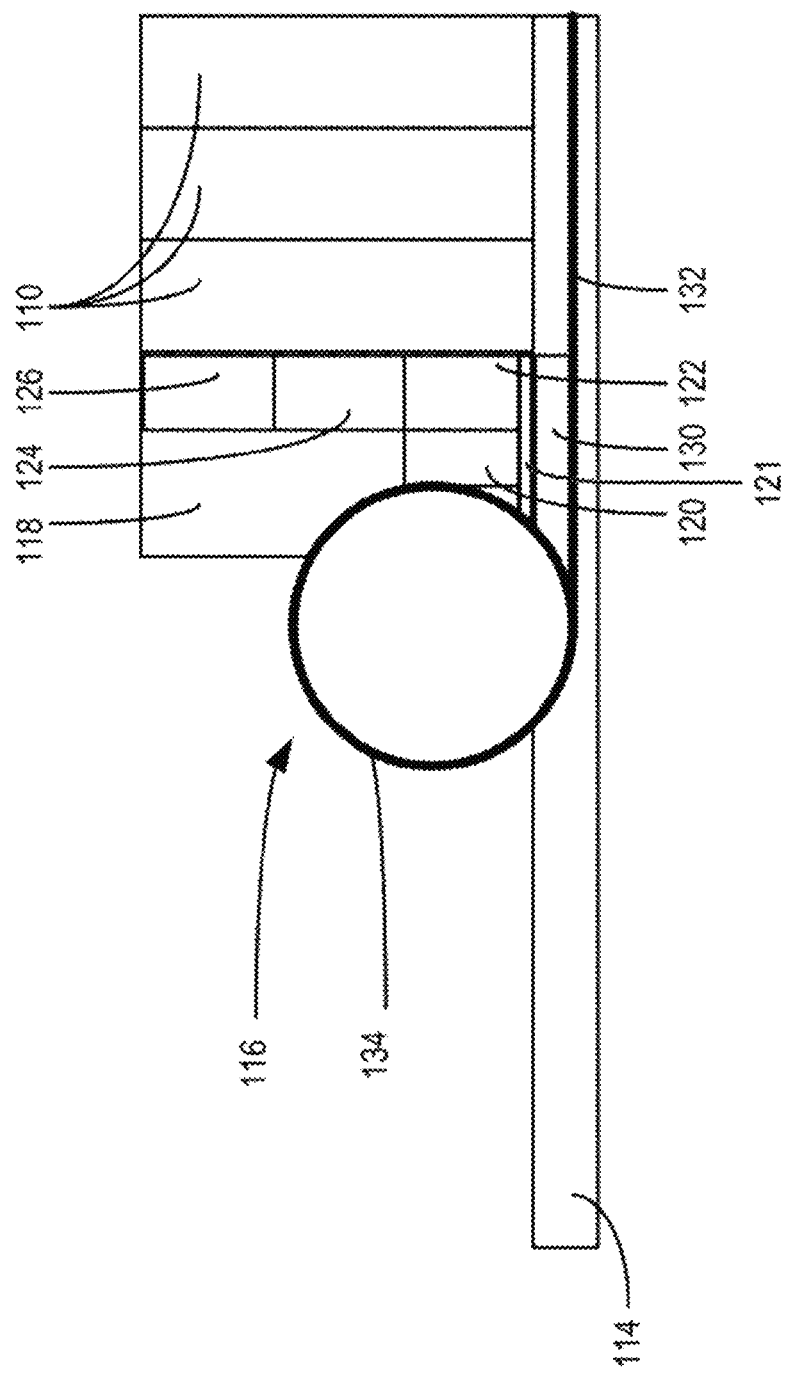
FIG. 4 is a sectional side view of the product unit for tracking product count in a distribution unit.

FIG. 2 is a top view of a product unit using a capacitance measurement to determine product count. FIG. 3 is a side view and FIG. 4 is a sectional side view of the product unit in FIG. 2. Through laboratory experimentation, it was found that the electrical capacitance of the spring-loaded dispenser's coil spring (relative to earth ground or an electrical circuit ground that approximates earth ground) varies according to the number of products (e.g. cigarette packs) that are present in the dispenser at any given time. The relationship is highly nonlinear and the capacitance can change due to environmental conditions such as temperature and humidity, but with software techniques (including automatic calibration) the product count can be determined with reasonable and useful accuracy.

The capacitive smart shelf design uses a capacitive sensor coupled with the coil spring to detect changes in capacitance as the spring-loaded slider (e.g. product positioner) traverses the length of the shelf. Since the position of the slider at a given time is indicative of how many products (in this case cigarette packs) are present in the shelf, the baseline capacitance and subsequent changes are used to estimate the number (count) of packs in the shelf at a given time. In order to achieve the desired accuracy and repeatability of product count determination, it was necessary to improve the dynamic range and linearity of the capacitive measurement. Through experimentation and analysis, it was found that it may be beneficial to add a counterpoise to the pusher piece of the shelf that connects to the ground connection of the printed circuit board. The counterpoise, as shown, for example, as counterpoise 121 of FIG. 4, is comprised of a conductive tape and is placed on the rear and bottom surface of the pusher. The smart shelf also has a LED that can be used during installation and provisioning to verify which device is being accessed. The capacitive sensor sends its measurements to a low power CPU and radio transceiver module to be processed.

When power is applied to the smart shelf, it may do a calibration to "zero out" the range of its measurement. Then it can immediately begin measuring the capacitance of the coil spring. The measurement data is sent to the transceiver module where the values are compared against a table of values. The table of values could be either pre-programmed into the device, or they could be determined during an installation procedure when the sensor is installed for maximum accuracy and repeatability. The transceiver module then communicates the raw data values to a cloud server via a cloud-connected gateway to be processed. The cloud-based software converts raw data values into product counts and makes such information available for display and communications to other information systems.

Numerous tests were conducted to determine the best configuration of the sensor to provide maximum linearity of measurement and dynamic range across the range of motion of the slider. It was determined that the printed circuit board (PCB) alone may not have an adequate size ground plane for an effective counterpoise and that additional ground plane may need to be added to the slider. An experimentally-optimized additional ground plane was fabricated using adhesive-backed foil tape and determined to be effective.

The product unit may include a track 111, a spring 116, and a product positioner 118. The track 111 may include rails 114 that extend along each side of the product unit. The rails 114 are mounted to a base plate 112 that supports the rails 114 and the product 110 stored in the track 111. The spring 116 may be a coil spring, for example, a ribbon of sheet metal that is biased to roll into a cylinder. The spring 116 may engage the product positioner 118 pushing the product positioner 118 towards the front of the track 111. As the product positioner 118 is pushed towards the front of the track, the product 110, for example cigarette packs, are pushed toward the front end of the track allowing the product to be presented for distribution. The spring 116 may engage a contact 120 on the product positioner 118. The spring 116 may be made of a conductive material and the contact 120 may also be made of a conductive material. As such, the spring 116 may be electrically connected to the contact 120 through the physical engagement. Contact 120 may be in electrical communication with a processor 122. The processor 122 may also have circuitry to measure a capacitance within the spring through the contact 120. The processor 122 may be connected to the ground plane 130 attached to the bottom of the product positioner 118. The ground plane may be an electrical conductor sheet configured to contact the straightened portion of the spring 132 extending from a coiled portion of the spring 134. The coiled portion of the spring 134 may have a capacitance that corresponds to the amount of the conductive material that is rolled into the coil portion 134. As such, the capacitance relates to the position of the product positioner 118 and may be determined by the processor 122 based on the capacitance of the spring 116.

The processor 122 may be connected to a transceiver 124. The transceiver 124 may communicate information from the processor 122 to a remote server. Further, the remote server may communicate information to the processor 122 through the transceiver 124.

A battery 126 may also be attached to the product positioner 118. The battery 126 may be a rechargeable battery. Further, the battery 126 may be connected to a power generation device, for example, a solar cell attached to the product positioner or track. The battery 126 may power the transceiver 124 and/or the processor 122.

Figure 5:
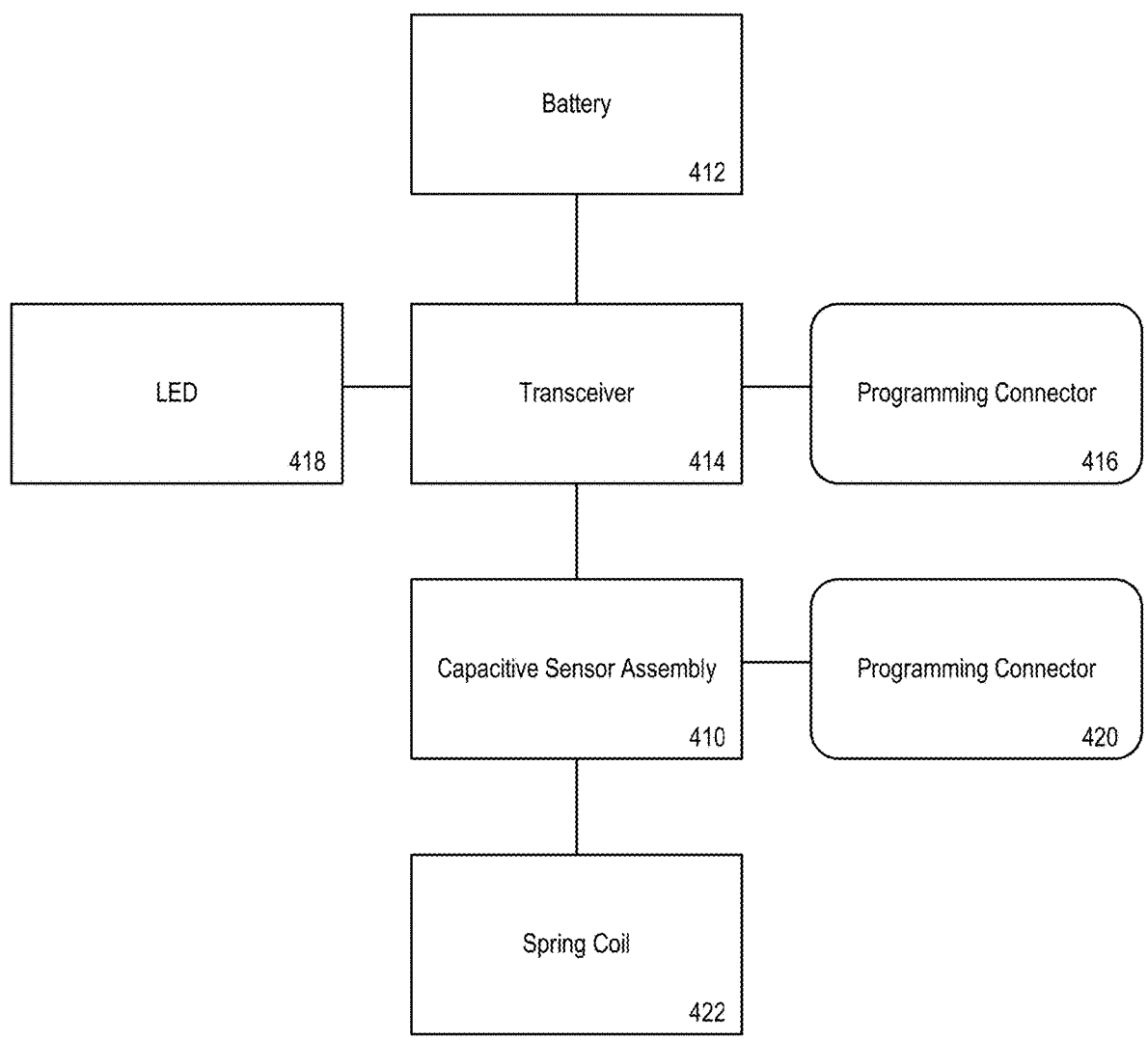
FIG. 5 is a block diagram illustrating one system for tracking product count in a distribution unit.

FIG. 5 is a block diagram of a system for determining product count. The system may include a capacitive sensor assembly 410 for measuring a capacitance in a spring coil 422. The capacitance in the spring coil 422 may vary based on how much of the spring coil is rolled. How much of the spring coil is rolled is indicative of the position of the spring coil and hence the position of the product positioner. The capacitive sensor assembly 410 may include a processor and capacitive measuring circuitry to determine an amount of capacitance inside the spring coil. Further, the capacitive sensor assembly 410 may communicate with a transceiver 414 to transmit capacitance status to a remote server. In some implementations, the capacitive sensor assembly may include calibration data and calculate a position of the product positioner based on the capacitance. As such, the processor and the capacitor sensor assembly may communicate with the transceiver to transmit position data to the remote server. In some implementations, the capacitive sensor assembly 410 may include calibration data to determine the product count in the track in response to the capacitance and/or the position data. In addition, the capacitive sensor assembly 410 may receive and store product information, for example, the dimensions of the product such as depth to determine a product count. The calibration information and/or product information may be received from the transceiver 414 and stored in the capacitor sensor assembly 410 or may be received from a programming connector 420 in communication with the capacitor sensor assembly 410. In addition, the transceiver may be in communication with a programming connector 416 that may be used to configure the communication parameters of the transceiver 414. The battery 412 may be in communication with the capacitor sensor assembly and the transceiver to power both the transceiver 414 and the processor server and circuitry of the capacitor sensor assembly 410. The LED 418 may be provided to indicate when the capacitor sensor assembly is being accessed through the transceiver 414. In addition, the LED 418 may indicate when the battery 412 is low and in need of charging or replacement. The LED 418 may indicate different modes such as battery replacement or communication by simple illumination, or by various blinking patterns. For example, two long blinks may indicate that the battery is low while a short blink may indicate that the transceiver is receiving information that is being communicated to the capacitive sensor assembly 410. The capacitive sensor assembly 410, the transceiver 414, the battery 412, and LED 418 may be located at the track where the product is located. Further, the processor sensor assembly 410, the battery 412, the transceiver 414, and the LED 418 may be mounted on the product positioner.

Figure 6:
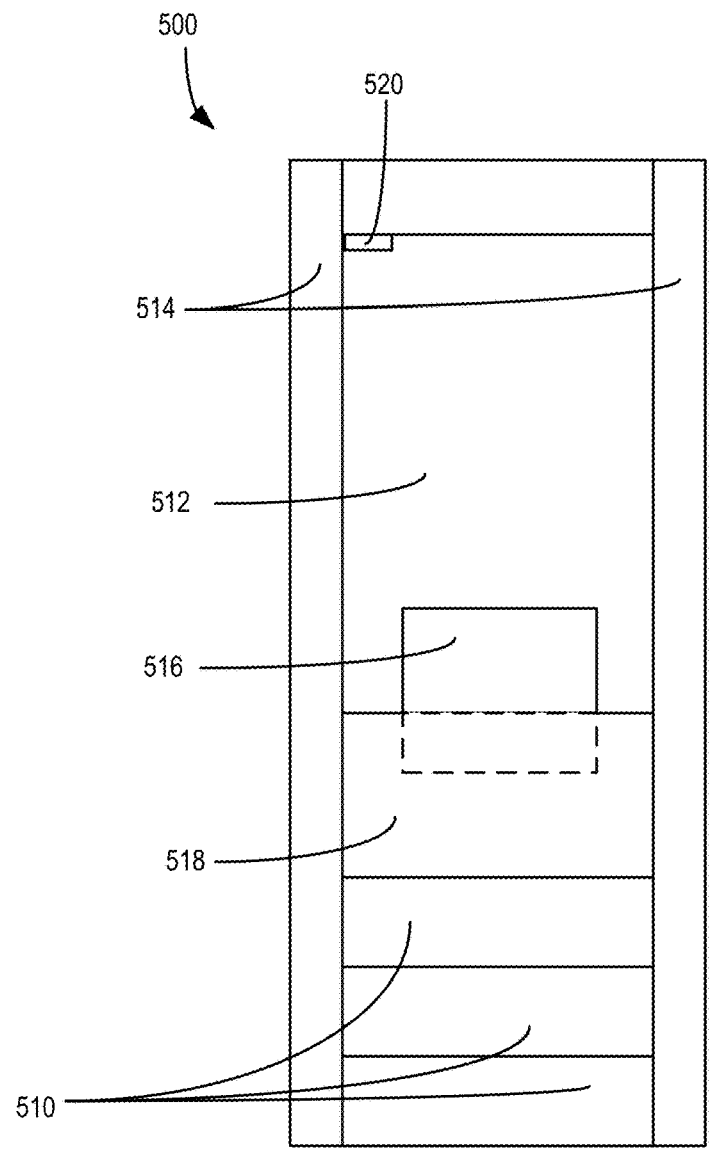
FIG. 6 is a top view of another product unit for tracking product count in a distribution unit.
Figure 7:
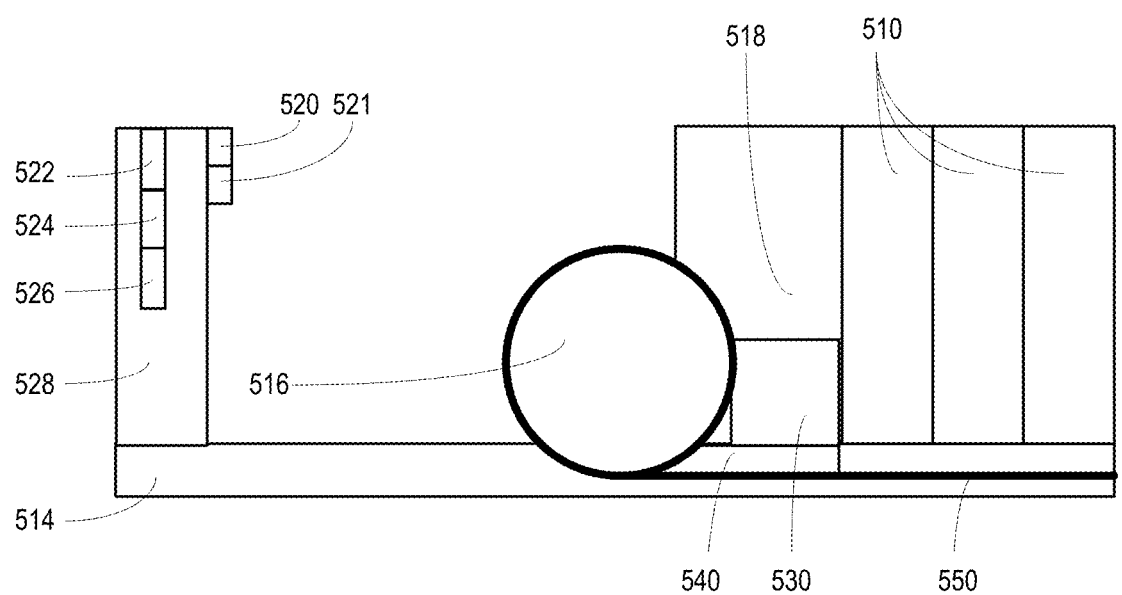
FIG. 7 is a sectional side view of the product unit for tracking product count in a distribution unit.

FIG. 6 is a top view of a product unit using a TOF sensor to determine product counts. FIG. 7 is a side view of the product unit in FIG. 6. The TOF principle is applied to accurately measure the distance from a fixed sensor located at the rear of the track to the product positioner of the product unit. The measured distance is proportional to the number of products (for example cigarette packs) contained in the sliding shelf at any given time.

The system may leverage a highly integrated TOF module from ST Microelectronics, part number VL53L0X. This module includes a Vertical Cavity Surface-Emitting Laser (VCSEL), Single Photon Avalanche Diode (SPAD) array, and processing circuitry to provide accurate range measurements over a wide range of environmental conditions such as the presence of dirt, dust, and moisture, and variations of temperature and humidity.

The TOF smart shelf may use a laser range finder mounted to the back of the shelf to measure the distance to the pusher on the shelf. The sensor may emit an infrared laser beam and then measure the amount of time it takes to be received back after being reflected off of the pusher surface. The TOF sensor module calculates the distance of the target (in this case the product positioner) using the time measurement and a constant representing the speed of light. The range measurements are then sent to a combination CPU and wireless transceiver module which reports the data to a cloud server via a cloud-connected gateway for processing. Software running in the cloud server converts the range measurements to product count (for example, cigarette packs).

The smart shelf may also include an LED that can be used during installation and provisioning (for example, using a mobile app running on a tablet or smartphone) to verify which device is being accessed and provisioned. This is useful when several TOF smart shelf sensors are located together.

The system 500 includes a track 511, a spring 516, and a product positioner 518. The track 511 includes rails 514 that extend along each side of the track. The rails 514 are mounted to a base plate 512 that supports the rails 514 and the product 510 stored in the track 511. The spring 516 may be a coil spring for example, a ribbon of sheet metal that is biased to roll into a cylinder. The spring 516 may engage the product positioner 518 pushing the product positioner 518 towards the front of the track 511. As the product positioner 518 is pushed towards the front of the track, the product 510 for example, cigarette packs, are pushed toward the front end of the track allowing the product to be presented for distribution.

The TOF sensor may include a laser source 520 and a photo-sensor 521. The laser source 520 and the photo-sensor 521 may be mounted on a mounting bracket 528 attached to the rear of the track 511. The laser source 520 may be positioned to project a beam from the rear of the track to the product positioner 518. The photo-sensor 521 is configured to detect the reflection of the beam back from the product positioner 518. The laser source 520 and the photo-sensor 521 may be in communication with the processor 522 to control illumination of the laser source 520 and detect when the beam is received by the photo-sensor 521. As described elsewhere, the processor 522 may determine a distance based on a time of flight of the laser beam from the laser source 520 to the target (e.g. product positioner 518) and back to the photo-sensor 521.

The processor 522 may be connected to a transceiver 524. The transceiver 524 may communicate information from the processor 522 to a remote server. Further, the remote server may communicate information to the processor 522 through the transceiver 524.

A battery 526 may also be attached to the product positioner 518. The battery 526 may be a rechargeable battery. Further, the battery 526 may be connected to a power generation device, for example, a solar cell attached to the product positioner or track. The battery 526 may power the transceiver 524 and/or the processor 522.

Figure 8:
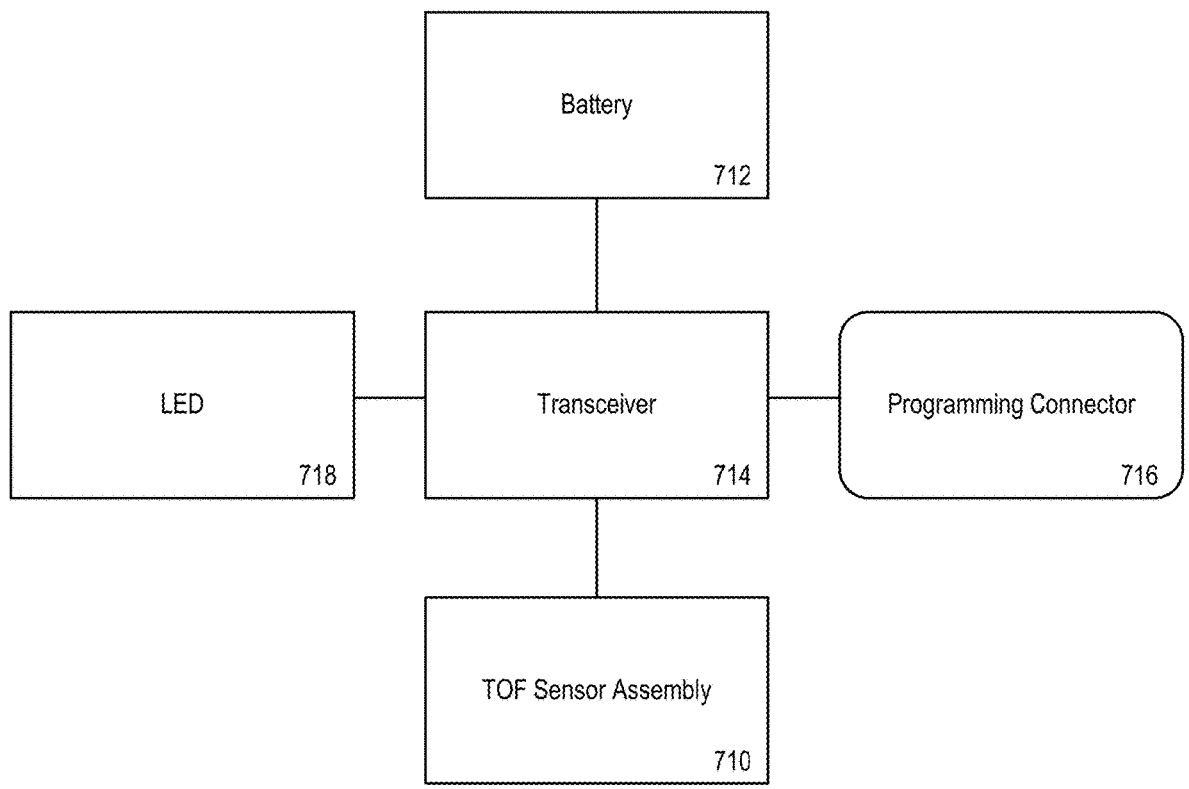
FIG. 8 is a block diagram illustrating one system for tracking product count in a distribution unit.

FIG. 8 is a block diagram of a system for determining product count. The system may include a TOF assembly 710 for measuring a distance to a target (e.g. a product positioner). Further, the TOF sensor assembly 710 may communicate with a transceiver 714 to transmit distance data to a remote server. In some implementations, the TOF sensor assembly 710 may include calibration data and calculate a position of the product positioner based on the distance data. As such, the TOF sensor assembly 710 may communicate with the transceiver 714 to transmit position data to the remote server. In some implementations, the TOF sensor assembly 710 may include calibration data to determine the product count in response to the distance and/or the position data. In addition, the TOF sensor assembly 710 may receive and store product information, for example, the dimensions of the product such as depth to determine a product count. The calibration information and/or product information may be received from the transceiver 714 and stored in the TOF sensor assembly 710. In addition, the transceiver may be in communication with a programming connector 716 that may be used to configure the communication parameters of the transceiver 714. The battery 712 may be in communication with the capacitor sensor assembly and the transceiver to power both the transceiver 714 and the processor server and circuitry of the TOF sensor assembly 710. The LED 718 may be provided to indicate when the TOF sensor assembly 710 is being accessed through the transceiver 714. In addition, the LED 718 may indicate when the battery 712 is low and in need of charging or replacement. The LED 718 may indicate different modes such as battery replacement or communication by simple illumination, or various blinking patterns. For example, two long blinks may indicate that the battery is low while a short blink may indicate that the transceiver is receiving information that is being communicated to the capacitor sensor assembly. The TOF sensor assembly 710, the transceiver 714, the battery 712, and LED 718 may be located at the track where the product is located. Further, the TOF sensor assembly 710, the battery 712, the transceiver 714, and the LED 718 may be mounted on the product positioner.

Referring again to FIG. 1, the sensors may monitor characteristics of one or more product units 108 in a dispensing unit 105. Alerts may be generated based on the amount of product in the product units 108 or dispensing units 105 when compared to a fill threshold. The store clerk may be notified to restock or manufacturers may be notified to order more product.

Alerts may be generated based on measured product count characteristics. The store clerk may be notified to restock or perform maintenance tasks. This information may also be used to generate electronic coupons or in store advertisements in response to the measured characteristics, for example the amount of a particular product that is available. (e.g. if it is below a threshold offers such as discounts may be given to sell the last one, alternatively if a particular product is not available or in low supply discounts may be offered or coupons generated on comparable products that are more available.) Data from these sensors may be communicated to a router or server 150 via a network 118. The network may be a wired network and/or a wireless network. As such, the sensors may include a wireless transmitter to connect to the server 150 via a wireless network such as Wi-Fi, BlueTooth, etc.

Upon receiving the data from the sensors the server 150 may store the data locally in a storage device 152. The server may also analyze the data and determine certain thresholds based on the characteristics of the sensor exceeding a certain value, or based on the comparison between various sensors, or based on an alert provided from a particular sensor the server 150 may communicate with a mobile device 166 that may be configured with an application for notifying a store clerk with an action needed to be taken with regard to maintenance or restocking. In addition, the server 150 may communicate with a mobile device 167 from a consumer based on an application loaded on the mobile device 167.

The application may allow the user to receive communication from a local network within the store. The application may allow the mobile device 167 to provide a user interface to present offers and/or electronic coupons to the consumer in response to the characteristics monitored by the smart sensors and/or a comparison of the smart sensors and/or a comparison of the monitored data with a threshold. In addition, the server 150 may be in communication with a display device 170 located within the store or on the store grounds as noted by box 172. The display 170 may be a public display, for example, a monitored unit or sign display to provide an offer or message to a consumer in response to product information.

The server 150 may compare point of sale (POS) data indicating when particular products are sold with a time when those products are removed from the shelf as indicated by the sensor located on the product units and determined product counts. As such, the server 150 may determine that products are missing or stolen if product counts go down but there is no sale information for the corresponding products from the POS system within a given period of time. This information may be used to review store video to identify the discrepancy in the data. Further, this information may be correlated to times of the day or employees that were working during time periods when product discrepancies occur. Alerts or warnings may be provided to store clerks or store managers based on the data discrepancies to product loss.

The server 150 may communicate with an external server 174 located in a remote location such as corporate headquarters. The server 174 may receive data from the server 150. The server 150 may push the data to the server 174 and/or, the server 174 may request the data from the server 150. The data may be streamed in real time to the server 174 or accumulated and provided in batches, for example, after the store is closed or in the late evening hours. Further, certain data may be provided at different times based on a data priority. For example, alerts that a characteristic exceeded a certain threshold may generate a message that is immediately transmitted from server 150 to server 174 whereas the actual monitored data may be transmitted at a later time as a different priority. The data that the server 174 may be stored in a data storage unit 176 and may be retrieved by server 174 or other servers for additional data analysis. The server 174 may communicate via a network 178 with various other devices. For example, server 174 may communicate with a billboard display 182. The billboard display may display the characteristics that are monitored by the sensors located on the product preparation or dispensing devices. In addition, the billboard display may display product information from the store being monitored by the system. The billboard display may also product quantity or restocking to entice consumers to stop at the store.

The server 174 may communicate with an equipment OEM or repair facility 184. The server 174 may communicate with the equipment OEM or repair request system 184 to request maintenance, for example on dispensing system. Further the system 174 may generate an offer such as an electronic coupon and send the electronic coupon to a user device 180 based on the product count characteristics and additional information including for example the user profile information stored on the server 174 or the remote device 180, the location information related to the electronic device 184 other factors.

Store Clerk

The store clerk may receive notifications for various situations. The determination to transmit the notification may be in the server 150 located in the store 110 and/or by the remote server 174. The store clerk may receive notifications on a mobile or display device through a local network via server 150. The store clerk may receive notifications on various devices through a wide area network via server 150 or remote server 174.

The system may generate, collect and monitor data related to tasks assigned to personnel. The data may include notification of a task. (via email, text, website, app, other smart device (e.g. name badge), voice to headset, etc., accept task employee ID, accept task time, presentation of task location, presentation of task description/check list, assistance notification, notification from personnel task has been completed, confirmation from sensor system that task has been completed, provide rating for particular personnel based on time to start tasks, time to complete tasks, quality feedback of tasks (consumers/store manager).

Product notifications may be triggered or tasks may be generated in response to various events such as, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time.

Individual notification triggers can be delivered via any or all of a POS system, Tablet App, Smartphone (App, SMS), Smartwatch (E-Mail), other wearable devices (E-mail, App, notification, SMS). General data may be distributed at the defined frequency, distributed based on a trigger or threshold being exceeded, and accessible any time in dashboard form via any or all of POS system, Tablet App, Smartphone (App, SMS link to Web landing), or voice command system.

In some implementations, a portable device that is in the posession of a consumer may communicate with the system to trigger an offer or alert in response to the consumer (e.g. and therefore the device) being located in or within a threshold distance to the store, the inventory levels of a product (e.g. as determined by the smart shelf sensor), and the consumer purchasing history (e.g. POS data) that indicates an interest (e.g. previous purchases of the product or competive product). The threshold distance may be set or adjusted by the system automatically, or in some implementations may be adjustable by the consumer. (The location may be determined by the gps or positioning system in the device; or the location may be determined by a local beacon (e.g. bluetooth signal or Wifi) in the store. The alert or offer may be based on a threshold inventory, e.g. above and/or below a certain number of units in smart shelf; the threshold may be set or adjusted by the system automatically (e.g. based on sales statistics, inventory numbers, or other variables discussed herein that are measured by the system), or in some implementations may be adjustable by the consumer. The device may interact with the system and/or the beacon through an application for example an electronic coupon application on the device.

Additional data sources that are potentially relevant for the store clerks may include Corporate systems (compliance info, updated process guidelines, other information), CPG systems (offer availability), POS data (consumer purchasing history). Potentially amended process/use case for store clerks may include updated compliance information being sent from corporate systems to the store and, in combination with data sent from sensor device(s), the store clerk amends the thresholds or dashboard reporting frequencies (or other compliance related metrics) that have been previously set. One process may include the clerk receiving alert when a regular product (e.g. Coca-Cola, tobacco products, etc.) purchaser (based on POS data history) enters the store. If the product count is above a certain threshold, he/she will be prompted to open offer dashboard provided by CPG (Coca-Cola) system, check if an offer is available and, if so, volunteer to the consumer that the offer is available. Another process may include the clerk receiving alert when a purchaser particularly interested in a particular product (based on profile or preference history) enters the store. If a product count exceeds a certain threshold, he/she will be prompted to open offer dashboard provided by the system, check if an offer is available and, if so, volunteer to the consumer that the offer is available.

Store Manager

The store manager may receive notifications for various situations. The determination to transmit the notification may be in the server 150 located in the store 110 and/or by the remote server 174. The store manager may receive notifications on a mobile or display device through a local network via server 150. The store manager may receive notifications on various devices through a wide area network via server 150 or remote server 174.

Product notifications may be triggered or tasks may be generated based on events such as, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time.

Additional collected data from the sensors may be delivered at defined time/time interval(s) and analyzed for sending additional notifications or tasks generated based on a exceeding a threshold (upper, lower, or based on a comparison) of one or more of number of notification triggers and their type.

Individual notification triggers can be delivered via any or all of POS system, Tablet App, Smartphone (App, SMS), Smartwatch (App, SMS), Other wearable devices (E-mail, App, notification, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of POS system, Tablet App, Smartphone (App, SMS link to Web landing), Smartwatch (App, SMS link to Web landing), Other wearable devices (E-mail, App, notification, SMS), Desktop PC (E-Mail, Web Landing Page), Laptop PC (E-Mail, Web Landing Page), or voice command system.

Additional data sources that are potentially relevant for the store managers may include Corporate systems (compliance info, updated process guidelines, other), CPG systems (offer availability), Store systems (clerk performance history), POS system (consumer purchasing history). Potentially amended process/use case for store managers may include updated compliance information being sent from corporate systems to the store and, in combination with data sent from sensor device(s), the store clerk amends the product count parameters (e.g. thresholds) that have been set. Another process may include generating information accessible in dashboard form for manager to pull down. For example based on product count info provided by the sensor device, the manager may be presented with a interface to 'activate' an offer that is relevant in select stores for a certain period. Another process may include generating dashboard reports for sensor device, pushed to the manager at a defined frequency, that provide info, graphics, and/or alerts around sensor management and compliance can be a key data point that is used in combination with other clerk performance data to enhance the performance appraisal process.

CPGs

The CPGs or food service vendors may receive notifications for various situations. The determination to transmit the notification may be in the server 150 located in the store 110 and/or by the remote server 174. The CPGs or food service vendors may receive notifications on a mobile or display device through a local network via server 150. The CPGs or food service vendors may receive notifications on various devices through a wide area network via server 150 or remote server 174. Product notifications may be triggered or tasks may be generated based on events such as, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time, Inventory levels (above/below threshold), delivery truck needs to be routed, additional order quantity added to store order.

Additional collected data from the sensors may be delivered at defined time/time interval(s) and analyzed for sending additional notifications based on a exceeding a threshold (upper, lower, or based on a comparison) of one or more of, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time.

Individual notification triggers can be delivered via any or all of POS system, Tablet App, Smartphone (App, SMS), Smartwatch (App, SMS), Other wearable devices (E-mail, App, notification, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of POS system, Tablet App, Smartphone (App, SMS link to Web landing), Smartwatch (App, SMS link to Web landing), Other wearable devices (E-mail, App, notification, SMS), Desktop PC (E-Mail, Web Landing Page), Laptop PC (E-Mail, Web Landing Page), or voice command system.

Additional data sources that are potentially relevant for the CPGs may include a POS system (consumer purchasing history). Potentially amended process/use cases for CPGs may include analyzing the propensity for loyal consumers to purchase or enter the store, as a function of product information (e.g. replenishment times, replenishment rates, or quantity), are made available to the CPG (hence answering the question—how effective are automatic or sensor driven product offers or messages).

Consumers

The consumers may receive notifications for various situations. The determination to transmit the notification may be in the server 150 located in the store 110 and/or by the remote server 174. The consumers may receive notifications on a mobile or display device through a local network via server 150. The consumers may receive notifications on various devices through a wide area network via server 150 or remote server 174. Notifications may be triggered based on a time which a product was restocked, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time.

In some implementations, a portable device that is in the posession of a consumer may communicate with the system to trigger an offer or alert in response to the consumer (e.g. and therefore the device) being located in or within a threshold distance to the store, the inventory levels of a product (e.g. as determined by the smart shelf sensor), and the consumer purchasing history (e.g. POS data) that indicates an interest (e.g. previous purchases of the product or competive product). The threshold distance may be set or adjusted by the system automatically, or in some implementations may be adjustable by the consumer. (The location may be determined by the gps or positioning system in the device; or the location may be determined by a local beacon (e.g. bluetooth signal or Wifi) in the store. The alert or offer may be based on a threshold inventory, e.g. above and/or below a certain number of units in smart shelf; the threshold may be set or adjusted by the system automatically, or in some implementations may be adjustable by the consumer. The device may interact with the system and/or the beacon through an application for example an electronic coupon application on the device.

Additional collected data from the sensors may be delivered at defined time/time interval(s) and analyzed for sending additional notifications or generating tasks. The product notifications may be based on exceeding a threshold (upper, lower, or based on a comparison) of one or more of a product count exceeds (higher or lower than) a product count threshold, product depletion rate exceeds (higher or lower than) a product count threshold, a capacitance of the coil or a position of the product positioner exceeds (higher or lower than) a threshold, driven CPG offer and rebate availability statistics.

Individual notification triggers can be delivered via any or all of an Electronic LED, Tablet App, Smartphone (App, SMS), Smartwatch (App, SMS), Other wearable devices (E-mail, App, notification, SMS), Smart car infotainment (App, Alert). General data may be distributed at the defined frequency and accessible any time via any or all of an Electronic LED, Tablet App, Smartphone (App, SMS link to Web landing), Smartwatch (App, SMS link to Web landing), Desktop PC (E-Mail, Web Landing Page), Laptop PC (E-Mail, Web Landing Page), or voice command system.

Equipment OEMs

The equipment OEMs or repair services may receive notifications for various situations. The determination to transmit the notification may be in the server 150 located in the store 110 and/or by the remote server 174. The equipment OEMs or repair services may receive notifications on a mobile or display device through a local network via server 150. The equipment OEMs or repair services may receive notifications on various devices through a wide area network via server 150 or remote server 174. Notifications may be triggered based on events such as, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time.

Additional collected data from the sensors may be delivered at defined time/time interval(s) and analyzed for sending additional notifications based on a exceeding a threshold (upper, lower, or based on a comparison) of one or more of, product count exceeds (higher or lower than) a product count threshold, product depletion rate exceeds (higher or lower than) a product count threshold, a capacitance of the coil or a position of the product positioner exceeds (higher or lower than) a threshold, dispensing unit or sensor is due for maintenance, based on defined frequency or time.

Individual notification triggers can be delivered via any or all of, Tablet App, Smartphone (App, SMS), Smartwatch (App, SMS), Desktop PC (E-Mail, Web Landing Page), Laptop PC (E-Mail, Web Landing Page). General data may be distributed at the defined frequency, distributed based on a trigger or threshold being exceeded, and accessible any time in dashboard form via any or all of Tablet App, Smartphone (App, SMS link to Web landing), Smartwatch (App, SMS link to Web landing), Desktop PC (E-Mail, Web Landing Page), Laptop PC (E-Mail, Web Landing Page), or voice command system.

The server 150 and/or server 174 includes communication interfaces 202, system circuitry 204, input/output (I/O) interfaces 206, and display circuitry 208 that generates user interfaces 210 locally or for remote display, e.g., in a web browser running on a local or remote machine through which a project is defined and resources are selected, evaluated, allocated, and connected to a project. The user interfaces 210 and the I/O interfaces 206 may include graphical user interfaces (GUIs), touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support WiFi network communications, for instance, under any version of IEEE 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include any combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 is part of the implementation of any desired functionality in the server 150 and/or server 174. As just one example, the system circuitry 204 may include one or more instruction processors 218 and memories 220. The memory 220 stores, for example, control instructions 222 and an operating system 224. In one implementation, the processor 218 executes the control instructions 222 and the operating system 224 to carry out any desired functionality for the server 150 and/or server 174. The control parameters 226 provide and specify configuration and operating options for the control instructions 222, operating system 224, and other functionality of the server 150 and/or server 174.

The server 150 and/or server 174 may include a local data repository 232 that includes volume storage devices, e.g., hard disk drives (HDDs) and solid state disk drives (SDDs). The storage devices may define and store databases that the control instructions 222 access, e.g., through a database control system, to perform the functionality implemented in the control instructions 222. In the example shown, the databases include a resource data database 228 and a project data database 230. In other implementations, any of the databases may be part of a single database structure, and, more generally, may be implemented logically or physically in many different ways. Each of the databases defines tables storing records that the control instructions 222 read, write, delete, and modify to perform the processing noted below. The resources descriptors may maintain their own resource descriptor data repositories. The system circuitry 204 may implement the resource analysis circuitry 114, project platform circuitry 116, and the operator control circuitry 118, e.g., as control instructions 222 executed by the processor 218.

The thresholds and alerts may be stored in one or more data bases and may be associated with the product or the product dispensing unit. For example, separate thresholds for each product characteristic such as product count and time may be stored for each product type in a product record. Separate thresholds for each dispensing unit characteristic such as amount of product contained, etc.; may be stored for dispensing unit type in a unit record.

Similar offers such as electronic coupons, in store advertisements or POS offers may be stored in records related to the product, dispensing unit, or a purchaser profile. Further, the offers may be generated and/or delivered in response to characteristics from or combinations of characteristics from the product, the dispensing unit, and a purchaser profile. Redemptions of electronic coupons and or purchases corresponding with in store advertisements may be tracked and analyzed with respect to the characteristics (e.g. product count and other characteristics) that were used to generate and/or deliver the offer. As such, the usefulness of the offers may be maximized. This may even be controlled in a feedback loop where the thresholds are adjusted based on redemption data and/or purchase correlation data.

The thresholds and alerts may be stored in one or more data bases and may be associated with the sensor or device. For example, separate thresholds for each product count characteristic may be stored for each sensor in a sensor record. Separate thresholds for characteristic of a device may be stored for each device in a device record.

Similar offers such as electronic coupons, in store advertisements or POS offers may be stored in records related to the sensor or a purchaser profile. Further, the offers may be generated and/or delivered in response to characteristics from or combinations of characteristics from the sensor characteristic, device characteristic, and a purchaser profile. Redemptions of electronic coupons and or purchases corresponding with in store advertisements may be tracked and analyzed with respect to the product count characteristics that were used to generate and/or deliver the offer. As such, the usefulness of the offers may be maximized. This may even be controlled in a feedback loop where the thresholds are adjusted based on redemption data and/or purchase correlation data.

Figure 9:
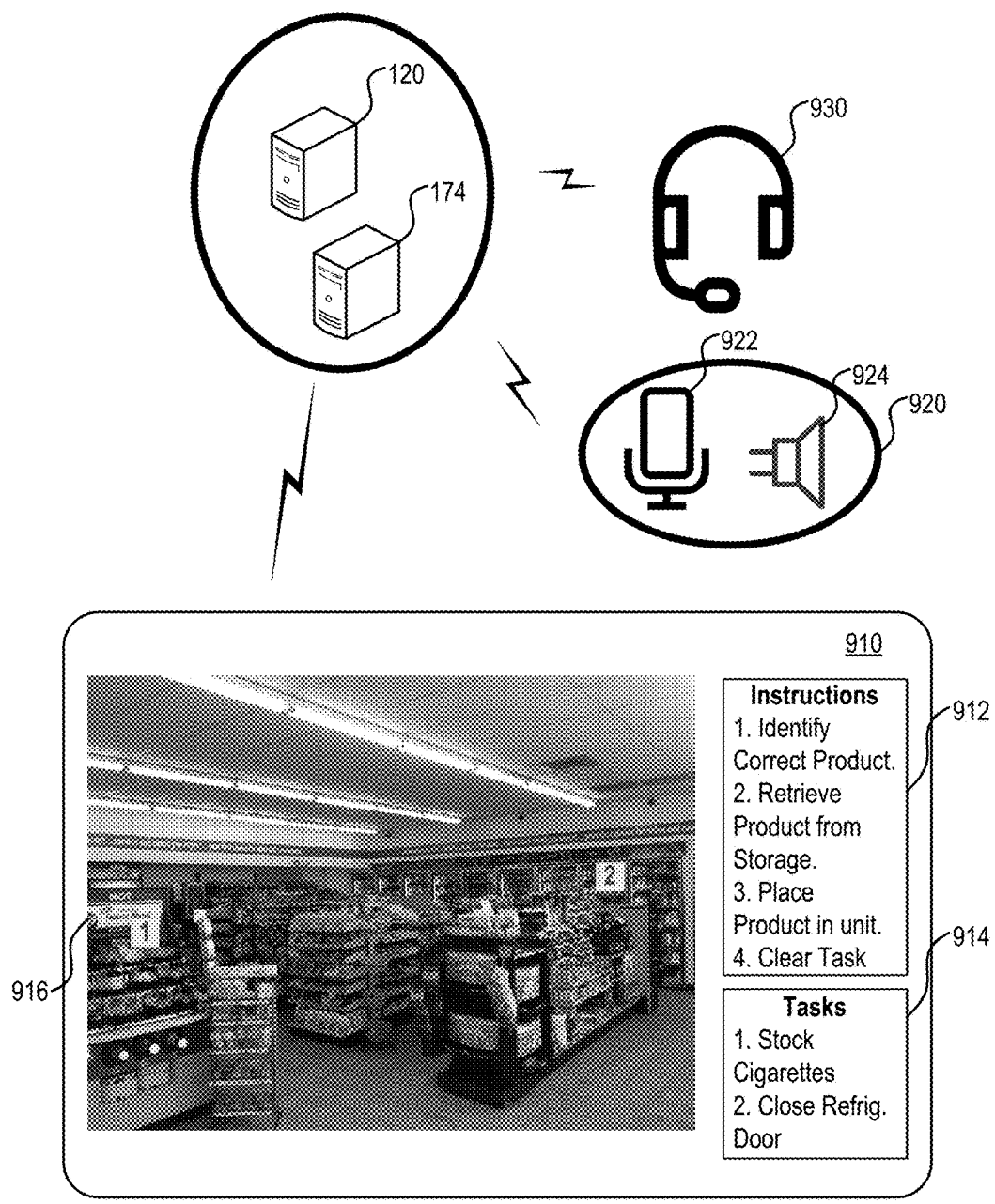
FIG. 9 is a schematic view of a user interface for tracking product count.

FIG. 9 is an illustration of a display device for a task monitoring system. The device 910 may be any one of the notification devices mentioned throughout this application, including any or all of POS system, Tablet, Smartphone, Smartwatch, Other wearable devices, Desktop PC, Laptop PC, etc. The display may include a list of tasks 914 to be completed. The tasks may be clickable, for example, links may be provided that display more information about each task. The display may include a list of instructions 912 on how to complete the task. The display may by default show the current task (e.g. first on the task list). However, directions may be switched to any task that is selected from the task list. The display may include a map 916 indicating the location of one or more tasks to be completed. In one example, only the current task location is marked with an indicator. In other implementations, different indicators may be used for the location for each task. In one example, the location may be marked with a number corresponding to the task number. For example, restocking a cigarette product unit is the current task, for example, the first task on the list. As such, the instructions for restocking may be displayed on the screen and the location of the product unit is marked on the map. The instructions may include the brand name, the product number, and the number of the product unit to be restocked. The display unit may communicate through the server 150 and/or server 172 to activate the led on the product unit to illuminate or blink a certain pattern. Scheduling of the task of restocking the shelf may be initiated by the sensor on the smart shelf unit and the measured count of product stored in the unit. The second task is to close the refrigerator door, as such the refrigerator that needs to be closed is marked on the map. The indicators may be overlaid on one or more pictures of the actual store in which the employee is working, thereby simplifying and clarifying the task for the employee. The employee may be logged into the device or application such that the map, tasks, or instructions may be those specifically related to the employee that is currently logged in.

The system may also include a microphone 922 and speaker 924 for voice command operation. The microphone 922 and speaker 924 may be integrated into a wearable headset assembly 930. Alternatively, the microphone 922 and speaker 924 may be in a small counter top assembly 920. In another example, the speaker and microphone may be utilized in a personal mobile device, such as a tablet, mobile phone or portable music player. The store clerk may receive instructions via automated verbal commands generated in response to tasks in the database. Further, verbal responses may be provided by the store clerk through the microphone, for example, using voice recognition technology. The particular store clerk may be identified by a device being used by the store clerk. For example, the store clerk may be logged into an application on that device, e.g. the clerk's mobile phone. In some instances, voice messages may be provided to the clerk through the speaker and the clerk may respond through an user interface on the display device. Any of the devices mentioned above may be in communication with the server 150 or server 174 to receive or transmit voice messages related to generated tasks.

As such, the system may send a broadcast message to multiple employees reporting a task to be completed. The system may determine who issues a voice response to accept the task by either determining which device (e.g. logon) responds or by performing voice recognition to identify the voice of the clerk. In another example, the system may select a clerk to which the task is assigned and generate a voice message to the particular clerk to which the task is assigned. The system may then wait for a voice response from the clerk to which the task is assigned whether the task is accepted or rejected. If the task is rejected or a response is not received within a given time period, the system may reassign the task to another clerk. If the task is accepted, the system may also wait for a voice response when the task has been completed. The system may also request statistics, such as quantity or type information, or maintenance information. The clerk may provide any requested information, but may also issue a help or assistance command to generate a task for a store manager or a service provider (such as a maintenance person).

In one example, the system may generate a voice command in response to a task to restock a given product (and ultimately the product data sensed by the sensor in the product unit). The clerk may speak a voice response that the task is accepted, which is received by the system processor. The processor may wait for a voice response from the clerk that the task is complete (e.g. the product has been restocked). If the task complete response is not received within a given time period, the processor may issue a verbal reminder to the clerk to which the task is assigned. In some instances, each step in the directions may be verbally provided through the speaker. The clerk may confirm completion after each step before the next step is read. Additional commands like repeat may be used to verbally provide the last instruction again.

In some instances, voice messages may be generated in response to tasks. In one example, the voice message may be an offer to a consumer. For example, after a task has been completed to make coffee, a voice message may be generated offering a discount to a consumer through an app on their phone or through a speaker mounted on or near the product unit. The message may say "[product name] restocked, two minutes ago." Further, the message may be generated in response to customer profile information, if the system senses the identity or location of a consumer within the store (e.g. through a loyalty app). In some instance, the message may be provided to the clerk instructing the clerk to offer a discount on the product based on the task or consumer profile information. Similarly, the system may remind (e.g. verbally through the speaker or through the display) the clerk of a consumer name and/or rewards status based on the profile information, so that the clerk may appropriately greet the consumer by name and thank them for their loyalty in relation to their rewards status.

In another example, the voice message to the consumer or clerk may be based on maintenance or appliance information. For example, "please try [product name] from our new supplier at a 50% discount." In another example, an OEM manufacturer or maintenance person may provide maintenance information during repairs. For example, the system may request and the maintenance person may provide information about cleaning, what parts are replaced, appliance up time, appliance down time, cause of failure, etc.

The store clerk and delivery person may use voice commands to verify and reconcile inventory information. The delivery person may speak the amount of each item delivered. The clerk can also speak the amount of inventory delivered and may speak the amount left on the shelf. This information may be used to verify inventory information (e.g. for ordering and POS tracking) and may be used reconcile bill for the delivered items with the product supplier.

The methods, devices, processors, modules, engines, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

As a person skilled in the art will readily appreciate, the above description is meant as an illustration of implementation of the principles this disclosure. This description is not intended to limit the scope or application of this system in that the system is susceptible to modification, variation and change, without departing from the spirit of this disclosure, as defined in the following claims.

We claim:

1. A system for tracking a count of a product in a distribution unit, the distribution unit having a front where the product is presented for dispensing, the system comprising:
    a track configured to hold the product in the distribution unit;
    a product positioner configured to push the product to the front of the distribution unit;
    a sensor configured to determine a position of the product positioner;
    a processor configured to calculate a product count based on the position as indicated in a signal from the sensor; and
    a transceiver configured to communicate with the processor and a server, the transceiver further configured to transmit the product count to the server, the server being configured to communicate one or more electronic coupon offers to consumer devices based on the product count, a current location of a customer, and an inventory threshold for the product;
    wherein the inventory threshold is adjusted based on a number of redemptions of the one or more electronic coupon offers.

2. The system according to claim 1, further comprising a spring configured to bias the product positioner toward the front of the distribution unit.

3. The system according to claim 2, wherein the sensor is a capacitive sensor; and
    wherein the system further comprises an electrically conductive contact in the product positioner engaging the spring.

4. The system according to claim 3, wherein the contact is in electrical communication with the capacitive sensor to measure a capacitance inside of the spring.

5. The system according to claim 1, wherein the sensor is a time of flight sensor.

6. The system according to claim 5, further comprising a bracket on the back of the dispensing unit, the sensor being mounted to the bracket.

7. The system according to claim 5, wherein the time of flight sensor is configured to direct a beam onto the product positioner and sense the beam reflecting back from the product positioner.

8. The system according to claim 1, further comprising a battery configured to power the processor and the sensor, the processor transmitting a signal to the server through the transceiver indicating a charging status of the battery.

9. The system according to claim 1, wherein the transceiver is configured to send position data based on the sensor to the server.

10. The system according to claim 1, wherein the server is configured to transmit a coupon in response to the position data from the sensor.

11. The system according to claim 1, wherein the server is configured to generate a product order in response to the position data from the sensor.

12. The system according to claim 1, wherein the transceiver is configured to receive calibration data for the sensor from the server.

13. The system according to claim 1, wherein the server is configured to transmit a coupon in response to the product count data from the sensor.

14. The system according to claim 1, wherein the server is configured to generate a product order in response to the product count data from the sensor.

15. The system according to claim 1, further comprising a light emitting diode located at the track to indicate which sensor is being accessed through the transceiver.

16. The system according to claim 1, further comprising a display located at the track to display a price for the product calculated based on a product count determined in response to the sensor.

17. The system according to claim 1, further comprising a light emitting diode located on the front of the distribution unit that is illuminated or blinking to indicate the alert comprising the notification of the task has been transmitted based on the sensor signal from that distribution unit.

18. The system according to claim 1, wherein the one or more electronic coupon offers are communicated in response to the product count being less than the inventory threshold.

19. The system according to claim 1, wherein the one or more electronic coupon offers are for an alternative product that is different from the product in the distribution unit.

20. A system for tracking a count of a product in a distribution unit, the distribution unit having a front where the product is presented for dispensing, the system comprising:
a track configured to hold the product in the distribution unit;
a product positioner configured to push the product to the front of the distribution unit;
a sensor configured to determine a position of the product positioner, the sensor being a capacitive sensor;
a processor configured to calculate a product count in response to the position based on a signal from the sensor;
a transceiver configured to communicate with the processor and a server, the transceiver further configured to transmit the product count to the server;
a spring configured to bias the product positioner toward the front of the distribution unit; and
an electrically conductive contact in the product positioner engaging the spring, the contact being in electrical communication with the capacitive sensor to measure a capacitance inside of the spring;
wherein the product positioner includes a ground plane on a bottom of the product positioner that engages an extended portion of the spring and a counterpoise comprising conductive tape is disposed on a rear surface of the product positioner and/or a bottom surface of the product positioner adjacent the ground plane.

21. A system for tracking a count of a product in a distribution unit, the distribution unit having a front where the product is presented for dispensing, the system comprising:
a track configured to hold the product in the distribution unit;
a product positioner configured to push the product to the front of the distribution unit, the product positioner including a ground plane on a bottom of the product positioner that engages an extended portion of a spring;
a sensor configured to determine a position of the product positioner; and
a processor configured to calculate a product count in response to the position;
wherein the product positioner includes the ground plane on a bottom of the product positioner that engages an extended portion of the spring and a counterpoise comprising conductive tape is disposed on a rear surface of the product positioner and/or a bottom surface of the product positioner adjacent the ground plane.

\* \* \* \* \*